United States Patent [19]
Harrison

[11] Patent Number: 5,668,690
[45] Date of Patent: Sep. 16, 1997

[54] METHOD AND APPARATUS FOR LIFETIME PREDICTION OF GAS LUBRICATED INTERFACES IN DATA STORAGE DEVICES

[76] Inventor: Joshua C. Harrison, 2727 Nelson Rd., #F-206, Longmont, Colo. 80503

[21] Appl. No.: 639,548

[22] Filed: Apr. 29, 1996

[51] Int. Cl.⁶ .............. G11B 21/21; G11B 5/60; G01B 5/28
[52] U.S. Cl. .............. 360/137; 360/103; 360/75; 73/7; 324/212
[58] Field of Search .................. 360/102, 103, 360/104, 137, 75; 73/7, 865.6; 324/212, 226, 262; 310/336; 384/1

[56] References Cited

U.S. PATENT DOCUMENTS

| | | | |
|---|---|---|---|
| 4,004,449 | 1/1977 | Gorey et al. | 73/7 |
| 4,416,144 | 11/1983 | Chen et al. | 73/12 |
| 5,038,625 | 8/1991 | Chen | 73/7 |
| 5,074,983 | 12/1991 | Eltoukhy et al. | 73/7 |
| 5,168,412 | 12/1992 | Doan et al. | 360/103 |
| 5,313,352 | 5/1994 | Chikazawa et al. | 360/103 |
| 5,375,451 | 12/1994 | Sandstrom | 73/7 |
| 5,425,487 | 6/1995 | Saito et al. | 226/196 |
| 5,539,592 | 7/1996 | Banks et al. | 360/75 |
| 5,545,989 | 8/1996 | Tian et al. | 324/212 |

FOREIGN PATENT DOCUMENTS

| | | |
|---|---|---|
| 58-29176 | 2/1983 | Japan . |
| 61-187179 | 8/1986 | Japan . |
| 2149915 | 6/1990 | Japan . |
| 4-17143 | 1/1992 | Japan . |
| 5203543 | 8/1993 | Japan . |
| 5250831 | 9/1993 | Japan . |

OTHER PUBLICATIONS

IEEE Trans. on Mags. "A Novel Accelerated Wear Test . . . " Peck et al, vol. 29, No. 6, Nov. 1993, p. 3969.

*Primary Examiner*—Robert S. Tupper
*Assistant Examiner*—David L. Ometz

[57] ABSTRACT

A method and apparatus is provided for accelerating the wear of gas lubricated surfaces that operate in intermittent contact. The method includes the generation of ultrasonic sound in the gaseous atmosphere surrounding the interface, and the further directing, focusing, or concentrating of said ultrasonic sound to impinge upon the gas bearing inlet. This method is capable of more accurate interface lifetime predictions than conventional methods, since, in contrast with conventional methods, the medial gas bearing properties, environmental parameters, and structural support conditions, present during testing, are unchanged from those present during typical operation. The present invention will also enable the evaluation of the effects of magnetic disk drive component design changes, in terms of head disk interface lifetime, even when a majority of the wear occurs during normal device operation and not during device starting or stopping. Conventional methods of wear acceleration cannot genuinely do this, and consequently distort the test results.

15 Claims, 5 Drawing Sheets

METHOD AND APPARATUS FOR LIFETIME PREDICTION OF GAS LUBRICATED INTERFACES IN DATA STORAGE DEVICES

BACKGROUND OF THE INVENTION

1. Field of the Invention

The present invention relates generally to testing methods for lifetime prediction of gas lubricated interfaces. The present invention relates more particularly, but not by way of limitation, to magnetic hard disk drive devices, and to the experimental acceleration of surface wear in the interfaces between the recording heads and the recording media, in magnetic hard disk drive devices.

2. Description of the Prior Art

In a magnetic hard disk drive device, data is written and read in concentric circular tracks on the surfaces of a stack of co-rotating disks. Magnetic recording heads, which are mechanically pressed against the disk surfaces by a "preload", read and write the data. The preload arises from the deflection, during disk drive assembly, of a supporting structure known as the Head Gimbal Assembly (HGA). In typical operation, heads are not in continuous contact with the disk surfaces, because of the intentional development of a gas separation layer, or "gas bearing", which acts as hydrodynamic lubrication. This gas bearing is comprised of a thin layer, or partial layer, of gas, entrained between the surfaces due to the tangential motion of the disk relative to the head, in the presence of the gaseous atmosphere present in the disk drive. This atmosphere is typically air. Head designers attempt to minimize the gas bearing thickness, or "fly height", since this minimizes bit-to-bit and track-to-track spacing on the disk, and thereby maximizes data storage capacity.

Many modern disk drive device designs have gas bearings that are so thin that the average minimum spacing between the recording head surface, and the disk surface, is just a few tens of nanometers, during normal operation. An example of a recording head design for such an application is given by Leung, et. al. in U.S. Pat. No. 5,473,485. In such designs, the recording head frequently contacts asperities on the disk surface during normal operation (ref.: Bogy, et. al., 1993), and the gas bearing does not offset all of the preload. The advantage of such designs is a higher data storage density on the disk surface. A disadvantage of such designs is that friction and wear of the head disk interface is no longer exclusive to periods of starting and stopping of the device, but can also occur in significant proportions during periods of normal operation.

The aforementioned disadvantage severely downgrades the accuracy of many conventional methods of experimental interface lifetime prediction. Three such methods are Pin On Disk testing (POD), Constant Speed Drag testing (CSD), and Contact Start Stop (CSS) testing. The patented method of Kobayashi, et. al. (U.S. Pat. No. 4,966,030) is an example of POD. The patented method of Eltoukhy, et. al. (U.S. Pat. No. 5,074,983) provides for correlation with CSS results. The patented method of Chen (U.S. Pat. No. 5,038,625) combines POD and CSS. Since POD, CSS, and CSD, accelerate wear through elimination or alteration of the aforementioned gas bearing, they are incapable of investigating the effect of medial gas bearing characteristics on tribological phenomena (ref.: Azarian and Bauer, 1993). CSS can only consider transient gas bearing characteristics during the periods of device start-up or shut-down. Furthermore, CSS and CSD testing is performed at disk speeds which are much lower than the design speed of the disk drive. This alters the energy associated with asperity contacts in the interface. Therefore, CSD & CSS testing can lead to inaccurate lifetime predictions for disk drive devices which have a very small typical gas bearing thickness during operation. They are also of very limited utility to the gas bearing designer.

For new disk drive designs, in which significant interface wear may occur in the presence of the fully developed gas bearing, more representative wear tests are needed to predict device lifetime. Several methods have been proposed to satisfy this need.

Peck, et. al. (1993), suggested acceleration of wear by increasing the preload on the head through the action of a pneumatic cylinder acting on the HGA. However, this method is not representative of the true wear situation in a disk drive since: the gas bearing stiffness and gas bearing resonance frequencies are altered. Furthermore, the boundary conditions on the HGA are also altered, giving rise to non-representative HGA resonance and compliance properties.

Another conventionally proposed method for accelerating wear, of the magnetic head disk interface, relies on the reduction of ambient pressure. However, this method also has the disadvantage that gas bearing properties and resonance frequencies are altered. Furthermore, tribochemical interactions at the interface may be altered due to changes in the concentration of available oxygen and water vapor.

Another conventionally proposed method increases wear rate by means of introduction of particulate contamination into the interface. However, this can only be a representative test if it is known, in advance, that three-body abrasive wear is the dominant failure mode in the actual disk drive. Furthermore, the properties of the wear particles which are generated naturally by the interface are not constant, since they oxidize over time and increase in hardness. Consequently, this method requires, in advance of testing, possession of much of the knowledge that testing is being accomplished to acquire.

The patented method of Chen (U.S. Pat. No. 4,416,144) provides for denting of the disk media at periodic intervals, and shows that disk topographical disturbances can excite gas bearing resonance. However, this method radically changes the disk topography. Asperity heights, thicknesses, and spatial distributions, resulting from this method, do not represent those found under operating conditions in the disk drive device, and so the accuracy of predictions based on this method is reduced. Furthermore, use of this method to compare different gas bearing designs, which have different minimum gas bearing thicknesses, necessitates the use of dents of different height. This does not facilitate the comparison of different gas bearing designs, as used on the same disk surface.

Other related prior art has had the object of reducing, rather than increasing, interface wear rate. The patented method of Bryant, et. al. (U.S. Pat. No. 5,466,979) uses non-uniform vibration, resulting from induced surface resonance, to reduce the wear rate of surfaces that are maintaining continuous sliding contact. However, this method is not applicable to magnetic head disk interfaces which have a gas bearing, due to a condition that the surfaces stay in continuous contact. Even if the method of Bryant et. al., allowed the existence of a gas bearing, gas bearing resonance excitation would not be allowed by the method, since, in that case, the condition that vibration be non-uniform over a length scale corresponding with "islands" of actual surface contact formed by surface topography, would be violated. Furthermore, the method of Bryant, et. al., if applied to disk drive technology, would require that a "force actuator", which is "coupled" with either the HGA or disk, would accomplish high frequency excitation. Such coupling would, in general, change system properties, due to the low mass of the recording head and HGA. This is clearly undesirable for a representative wear acceleration test method, and accordingly, it was not proposed by the inventors for such a use. Conversely, the de coupling of excitation source and interface behavior, as in the present invention, allows easier tuning of excitation frequency for coincidence with gas bearing resonance.

The patent of Chikazawa, et. al. (U.S. Pat. No. 5,313,352) covers fabrication of recording heads with a plurality of built-in piezoelectric actuators, each excited by an alternating electrical current, so as to vibrate the recording head, and thereby reduce static friction at the head disk interface during device starting and stopping. According to this purpose, in the method proposed by Chikazawa, et. al., the excitation is switched off during normal operation. However, this would cause any wear test, which is based on vibration excitation by such a method, to be insensitive to the me, dial characteristics of the gas bearing present under operating conditions in the disk drive device. Furthermore, such built-in piezoelectric actuators would require the connection of extra wires to each magnetic recording head, consequently hindering any wear testing process that uses the actuators. The presence of these wires would also, in general, change the static torque applied to the head during device operation, and/or change the net torsional stiffness of the head mounting gimbal. This would, in general, corrupt test results if such an actuator equipped head were used for wear testing. The use of such piezoelectric actuators, fabricated as part of the magnetic recording head, is also impractical for accelerated wear testing in a manufacturing environment, since at least one actuator equipped head would have to be specially fabricated for each wear test, and such specially fabricated heads would, in general, not have the same properties as randomly selected representative heads from typical manufacturing lots.

SUMMARY OF THE INVENTION

Methods used to increase the wear rate associated with the relative motion of normally proximate surfaces, can facilitate the experimental testing of the usable lifetime of devices containing these surfaces. Such experimental tests are necessarily of substantially shorter duration than the true device lifetime under operating conditions. Consequently, they can lead to inaccurate predictions if, in the course of accelerating wear, they also inadvertently change device characteristics, or change the nature of the process of wear which exists under operating conditions. The previously described wear acceleration methods of the prior art, include inaccuracies which result from such inadvertent changes. The present invention effectively overcomes this problem, for the case of devices containing surfaces, which are separated, or tending to be separated, by a very thin gas bearing.

In the method of this invention, interface wear is accelerated by means of non-contact gas bearing resonance excitation, accomplished by the generation of ultrasonic sound in the gaseous atmosphere surrounding the interface, and by the further directing, focusing, or concentrating of this ultrasonic sound to impinge upon the gas bearing inlet. Such gas beating resonances in magnetic hard disk drive devices are typically in the frequency range 20 kHz to 90 kHz. In a preferred embodiment of this invention, head disk interface contact intensity is monitored through acoustic emission (AE) sensing in a higher frequency pass band (400 kHz~700 kHz), and wear is measured by increases in the read back error rate of recorded data. Also in a preferred embodiment of this method, the frequency of the ultrasonic sound source is first adjusted in it's range (20 kHz~90 kHz), until a maximum contact intensity is detected by the AE sensor in it's range (400 kHz~700 kHz). This indicates that gas bearing resonance has been achieved. The degree of wear acceleration is then set by adjustment of the power to the AE source. The power of the ultrasonic sound excitation is always kept low enough, and of narrow enough frequency range, to avoid direct excitation of other structural resonances in the disk drive (HGA, disk, mounting structure, etc.). The gain of the gas bearing resonance amplifies the acoustic excitation locally at the head disk interface, and intensifies interface contacts, which in turn, accelerates wear. Other structural resonances are only excited through the resulting headdisk contacts (at ordinary disk speed), just as they would be naturally in the disk drive.

This method is capable of more accurate magnetic head disk interface lifetime predictions than conventional methods, since, in contrast with conventional methods, the medial gas bearing properties, environmental parameters, and HGA structural boundary conditions, present during testing, are unchanged from those present during typical disk drive device operation. Furthermore, this method facilitates the simultaneous in-situ testing of several interfaces in a disk drive device, and also facilitates wear testing while the HGA is randomly actuated laterally across the disk surface to simulate the seeking of information. The present invention will also enable the evaluation of the effects of disk drive and gas bearing design changes, in terms of usable interface lifetime, even when a majority of the wear occurs during normal device operation and not during start-up nor shut down. Conventional methods of wear acceleration cannot genuinely do this, and consequently distort the test results.

DETAILED DESCRIPTION OF THE INVENTION

Figure 1:
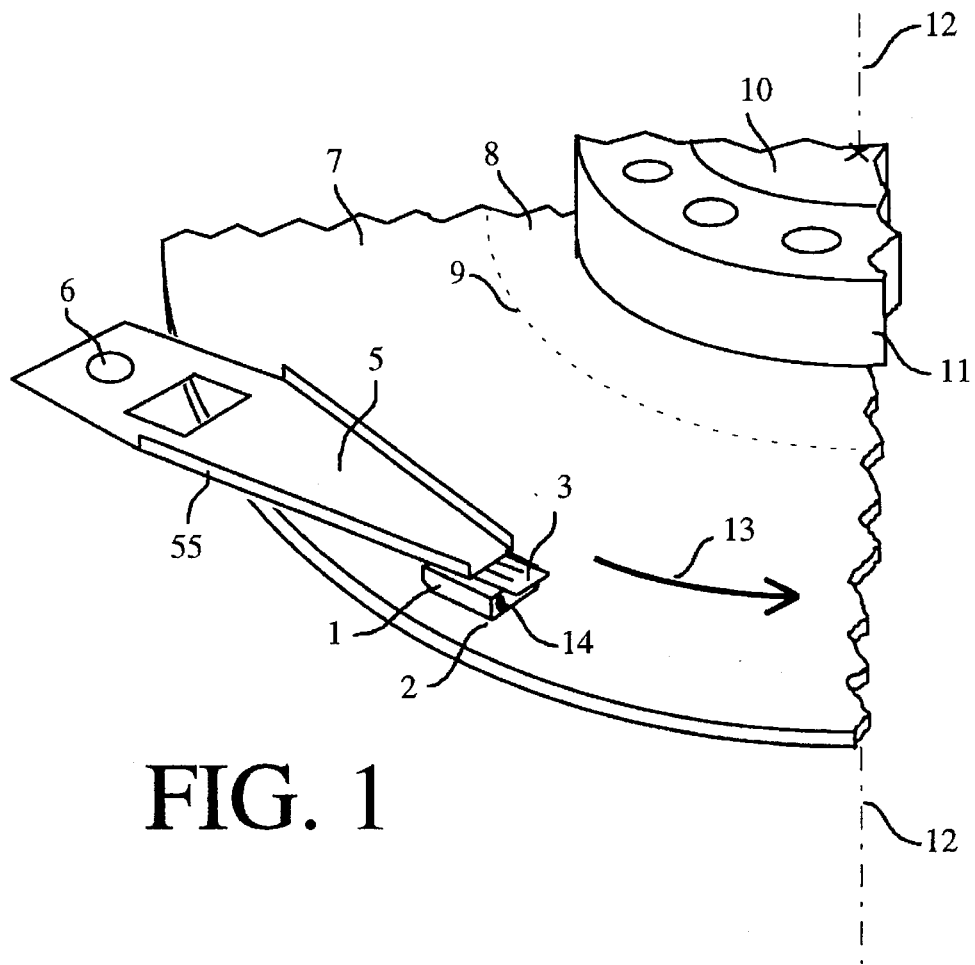
FIG. 1 is a perspective view of a magnetic recording head gimbal assembly (HGA), and of a cut-away portion of a rotating magnetic disk, showing an orientation of the HGA, with respect to the disk, that would be typical of conventional disk drive device operation.
Figure 2:
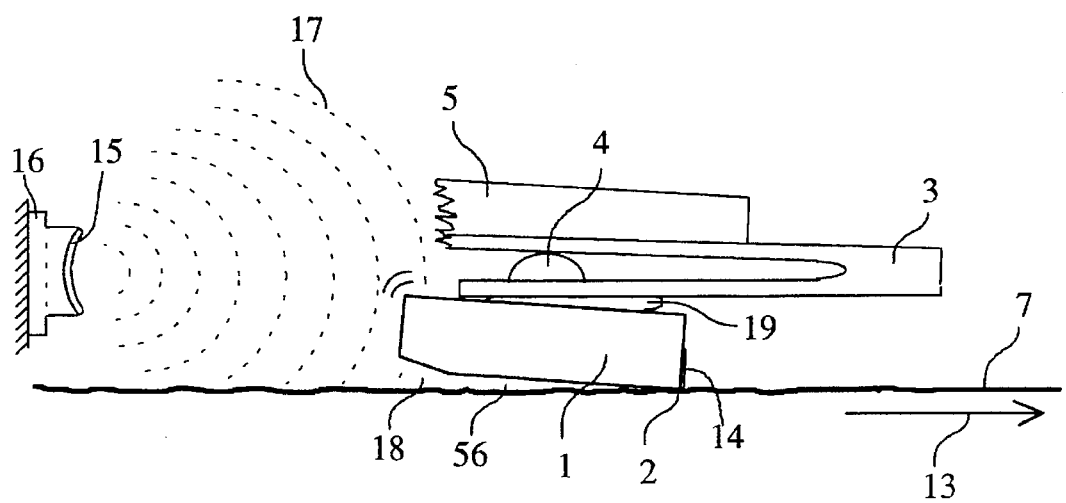
FIG. 2 is a side view of a magnetic recording head disk interface, and of a cut-away portion of the suspension assembly to which the head is attached, depicting implementation of the method of the invention.

The present invention includes a technologically superior method to increase, for testing purposes, the wear rate associated with the relative motion of normally proximate surfaces, that are separated, or tending to be separated, by a very thin gas bearing. Very thin gas bearings commonly occur in magnetic hard disk drive devices. Said gas is typically air in such devices. Referring now to FIG. 1 and FIG. 2, a recording head 1, containing magnetic transducer 14, is pressed against rotating disk 7, by action of suspension spring 5. Recording head 1 is attached to gimbal 3, by means of glue 19. Suspension spring 5 is attached, at the location of hole 6, to a means which spatially orients suspension spring 5 relative to spindle 10. Disk 7 is attached to spindle 10 by a clamping means 11, and the plurality rotates about axis 12. Recording head 1 would be in continuous sliding contact with the surface of disk 7, at interface location 2, except for the action of a very thin layer, or partial layer of gas 56, entrained between said surfaces at converging inlet 18, due to motion 13 of the disk 7, relative to head 1. Said layer, or partial layer of gas 56, is also referred to as the gas bearing 56. The action of said gas bearing 56 gives an intermittent nature to the surface contact, which occurs at interface location 2.

The head gimbal assembly (HGA 55) includes head 1, glue 19, gimbal 3, suspension spring 5, and hole 6. During typical operation of a disk drive device containing said surfaces, said intermittent contact excites resonances of the recording head 1, gas bearing 56, HGA 55, HGA supporting structure, and disk 7. In order to model the complex interactions of these contacts and resulting resonances, during an accelerated wear test, it is important that alterations to system properties are minimized or avoided. The present invention accomplishes wear acceleration by means of non-contact gas bearing resonance excitation, and so interface operating conditions, such as average gas bearing thickness, preload of suspension spring 5, ambient gas pressure, gas bearing vibration damping characteristics, and HGA structural boundary conditions, are completely unaltered. Consequently, and in contrast with the prior art, the accelerated wear test provided using the method of the present invention, is truly representative of wear which occurs under operating conditions.

FIG. 2 illustrates said non-contact gas bearing resonance excitation. Now referring to FIG. 2, pressure waves 17 are generated by means 15, which is fixed to positioning means 16. Said pressure waves 17 are generated in an ultrasonic frequency range, which is chosen, or tuned, so as to include one or more frequencies associated with resonance of, or involving, the gas bearing 56. Said pressure waves 17 are also referred to as ultrasonic sound 17. Ultrasonic sound 17 travels through the gas atmosphere to impinge upon gas bearing inlet 18. Much of the energy, that is associated with ultrasonic sound 17, is reflected by slider 1, or otherwise dissipated in the gas atmosphere. However, the small pressure disturbance at gas bearing inlet 18, which results from the local impingement of ultrasonic sound 17, is amplified by the gain of said gas bearing resonance. The dimensional form of the Reynolds equation, including all terms appropriate for the analysis of compressible hydrodynamic lubrication, and modified to consider gas rarefaction effects, can be numerically applied to the situation of the head disk interface in order to estimate the sensitivity of the gas bearing 56 to fluctuations of pressure at inlet 18.

Said gas bearing resonance intensifies contact between the recording head 1 and the disk 7. Said intensified contact, in turn, excites resonances of other device components, in a way that such resonances would be excited during typical device operation. The sum of these resonances, and intensified contact, accelerates wear in a way which is representative of the true nature of typical wear during normal operation of the device. Said intensified contact occurs under the same me, dial conditions, and at the same disk rotational speed, as contact which occurs during typical device operation. Furthermore, since this is a non-contact method, the structural components of the device need not be not altered or contacted, preserving their resonance behavior. This method can also be applied to devices, other than disk drive devices, which contain very thin gas bearings.

Figure 3:
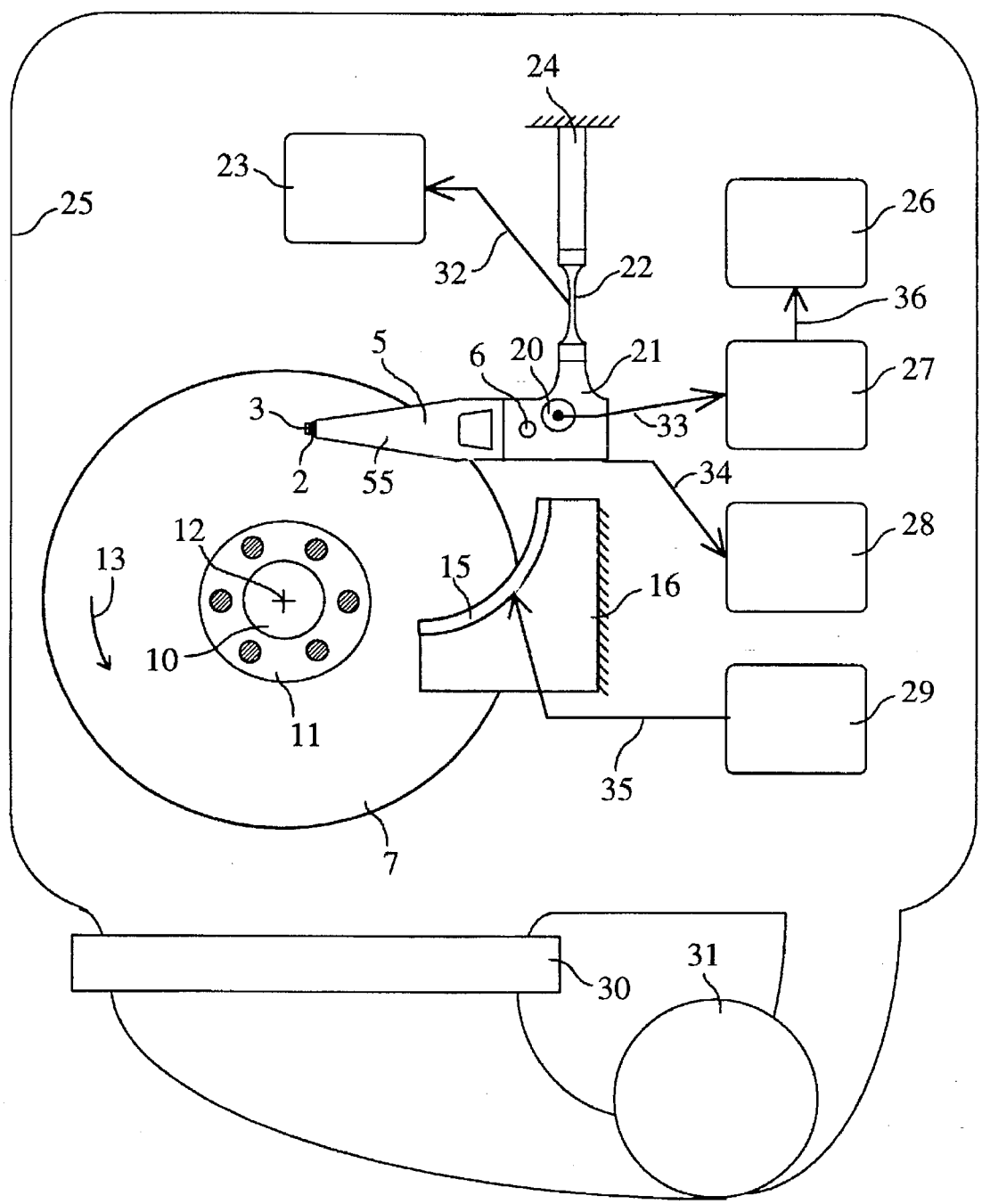
FIG. 3 illustrates an apparatus capable of effecting a first embodiment of the method of the invention.
Figure 4:
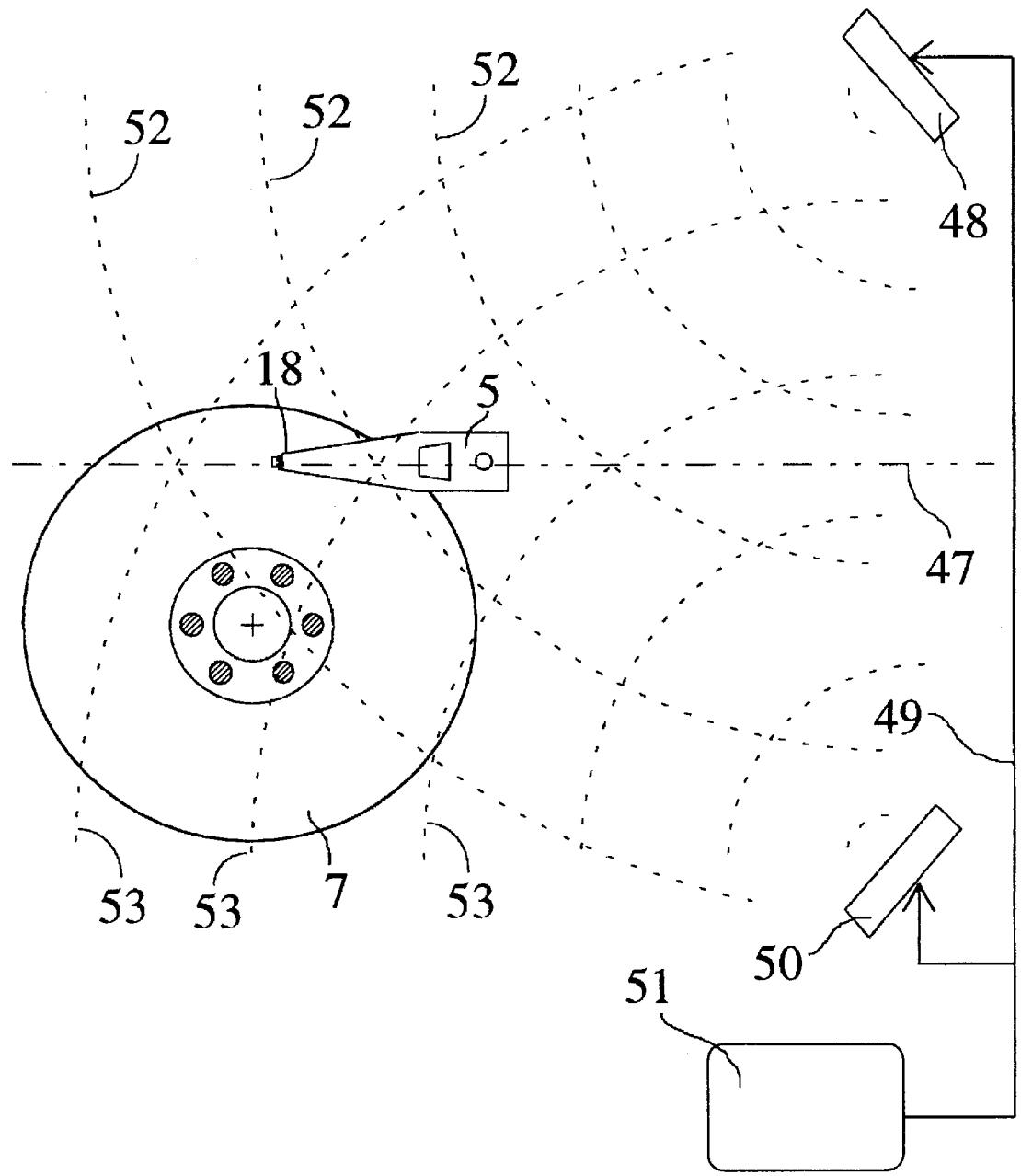
FIG. 4 illustrates a means for concentrating ultrasonic sound energy, in the region of the head disk interface, that is also compatible with the first embodiment of the method of the invention.

FIG. 3 illustrates an apparatus including a first embodiment of the invention. Referring to FIG. 2 and FIG. 3, ultrasonic sound generation means 15 is comprised of a crystal or ceramic which is excited to vibrate according to the piezo electric effect. In said embodiment, said crystal or ceramic may be fabricated with a concave surface of approximately parabolic shape, and may be oriented so as to concentrate ultrasonic sound in the vicinity of gas bearing inlet 18. Other ultrasonic sound generation means which can be utilized for the purposes of the first embodiment of the method of this invention, include a bar which is excited to vibrate according to magneto striction, a ring which is excited to vibrate according to magneto striction, or a gas whistle, or a plurality of said ultrasonic sound generation means. Now referring to FIG. 4, a plurality of ultrasonic sound generation means 48, 50 is driven by common electrical driver 51, via common electrical connection 49, so that said plurality 48, 50 produce sound of identical frequency. Said plurality 48 and 50 are spatially arranged so that sound waves 52, from ultrasonic sound generation means 48, constructively interfere with sound waves 53, from ultrasonic sound generation means 50, in the vicinity of line 47. The spatial arrangement is chosen such that said vicinity includes the location of the gas bearing inlet 18.

Again referring to FIG. 2 and FIG. 3, ultrasonic sound generation means 15 is fixed to a positioning means 16, and is driven by electrical signal 35, which is provided by electrical driver 29. Electrical driver 29 causes ultrasonic sound generation means 15 to produce ultrasonic sound which includes frequencies associated with one or more resonance of, or involving, the gas bearing 56. Such frequencies are typically in the range 20 kHz to 90 kHz in a conventional disk drive device.

An acoustic emissions detection transducer 20 is mounted on HGA mounting block 21, or on a portion of suspension spring 5 which overlaps with HGA mounting block 21. Said transducer 20 provides electrical signal 33 to filtering means 27. The filtered signal 36 is then displayed or recorded by a conventional means 26. The filtering means 27 removes components of the signal 33 that are in the driving frequency range of ultrasonic sound generation means 15. Filtering means 27 may be a high pass filter or a band pass filter. A typical frequency band which would be chosen to be passed by filter 27 in the method of this invention is 400 kHz–700 kHz. Acoustic emission in this frequency band is characteristic of resonance of head 1, and is indicative of the intensity of induced contact between the head 1 and disk 7. Furthermore, by adjusting the frequency of driver signal 35, in its range (20 kHz–90 kHz), so as to obtain a maximum in acoustic emission detection after filtering, in its range (400 kHz–700 kHz), the driver 29 can be tuned to more effectively excite gas bearing resonance.

An apparatus capable of effecting the first embodiment of the method of the invention has a means for indirect measurement of the extent of interface wear or degradation during operation of the apparatus. Said indirect measurement is preferably provided by a means of monitoring changes in the readability of data previously recorded on the disk 7 by transducer 14. Readability is defined in terms of the amplitude of the signal provided by transducer 14, or in terms of the quantity of errors in the data retrieved by means of the transducer 14, when transducer 14 is made to read said data. Said readability of said data is periodically measured during the course of the wear acceleration test, and said readability is compared with one or more prior readability measurements, to provide an indication of interface surface wear or degradation. Attentively, said indirect measurement may be provided by a static friction force measuring transducer 22, which provides an electrical signal 32 to an amplification or recording device 23. Said friction force measuring transducer 22 may be comprised of a cross-section reduction, which is instrumented with a plurality of strain gauges, each electrically connected to a bridge type amplifier. The HGA 55, the HGA mounting block 21, and the static friction force transducer 22, are all stationary relative to positioning means 24.

Figure 5:
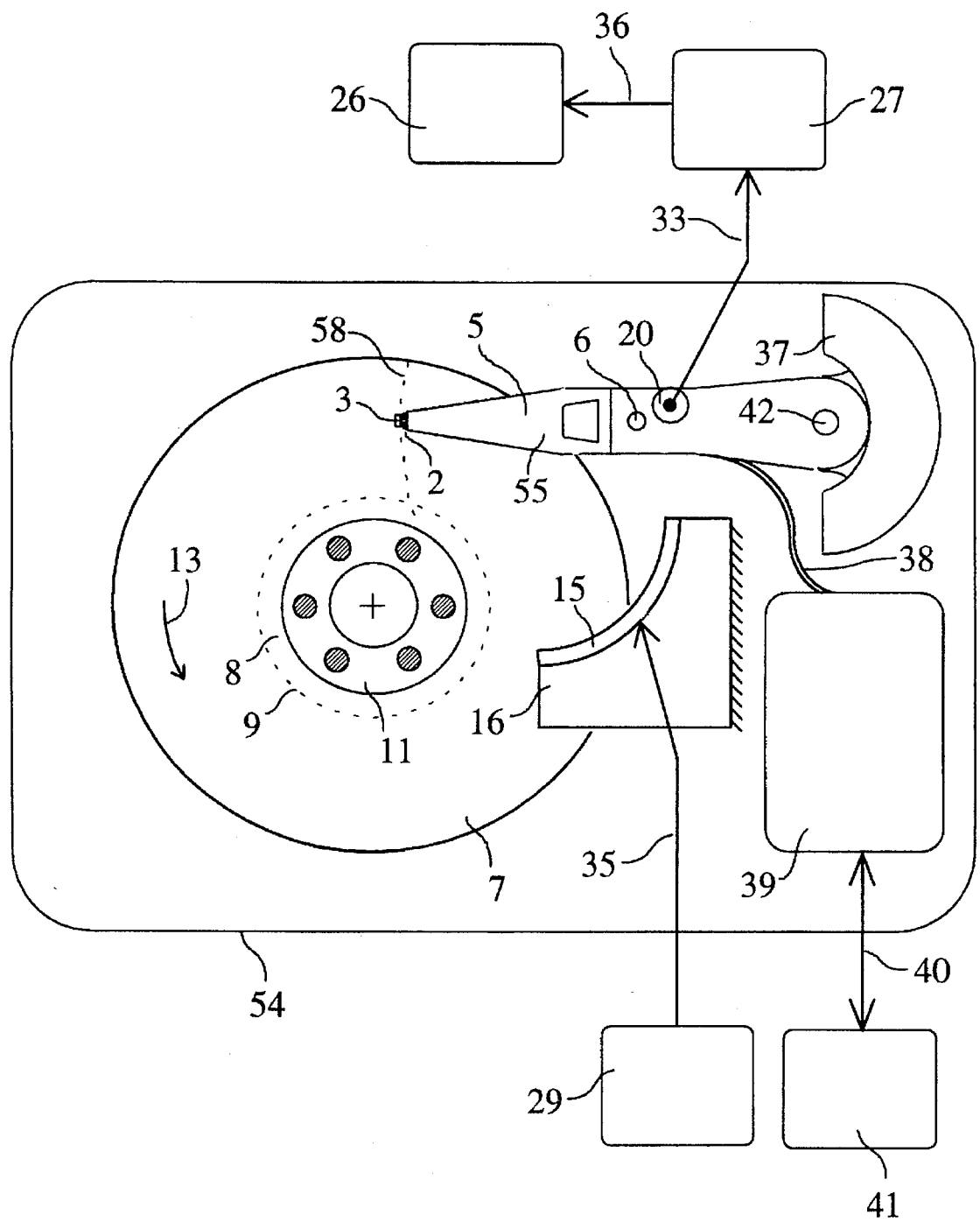
FIG. 5 illustrates an apparatus, which is partially comprised of a conventional disk drive device, and which is capable of effecting a second embodiment of the method of the invention.

In FIG. 3, all apparatus components are depicted as being enclosed by a gas containment means 25, which includes a conventional means 31 for causing said gas to pass through a filtering means 30. However, it is only necessary that the HGA 55, the HGA mounting 21 and positioning means 24, the disk 7, the disk clamping means 11, the rotating spindle 10, and the ultrasonic sound generation means 15, be enclosed within containment means A second embodiment of the invention is included in the apparatus, which is partially comprised of a conventional disk drive device 54, is shown in FIG. 5. Referring to FIG. 3 and FIG. 5, like numbered items perform the same function in the apparatus of the second embodiment as they do in the previously described apparatus of the first embodiment. However, in the apparatus of the second embodiment, the HGA 55 is mounted to the conventional actuator 37 of the disk drive device. Actuator 37 pivots about shaft 42, and is controlled by conventional disk drive device electronics 39 via electrical connection 38. Now referring to FIG. 2 and FIG. 5, electrical connection 38 also enables disk drive electronics 39 to control transducer 14 so as to facilitate recording and retrieval of information. Ultrasonic sound driving electronics 29, causes ultrasonic sound generation means 15 to excite resonance of gas bearing 56, as in the first embodiment, during periods of device operation. Testing electronics 41 interfaces with disk drive electronics 39 via electrical connection 40, so as to enable periodic determination of said data readability, as a means for indirect measurement of surface wear and degradation. Testing electronics 41 may also instruct the disk drive electronics 39 to cause actuator 37 to move head 1 to various positions on the circumference of an arc 58 centered on shaft 42, during the course of the accelerated wear test. Said movement simulates the accessing of information recorded at different radii on disk 7 by transducer 14 on head 1, in order to better simulate operating conditions during the accelerated wear test. As a non-contact method of gas bearing resonance excitation, the use of an ultra sonic sound generation means 15 is particularly compatible with such actuation of the HGA 55 during the accelerated wear test. Furthermore, if disk drive device 54 contains a plurality of interfaces, between a plurality of disk surfaces 7 and a plurality of HGA 55, then the use of an ultrasonic sound generation means 15, in order to accelerate wear, is particularly compatible with the simultaneous wear testing of said interfaces.

Figure 6:
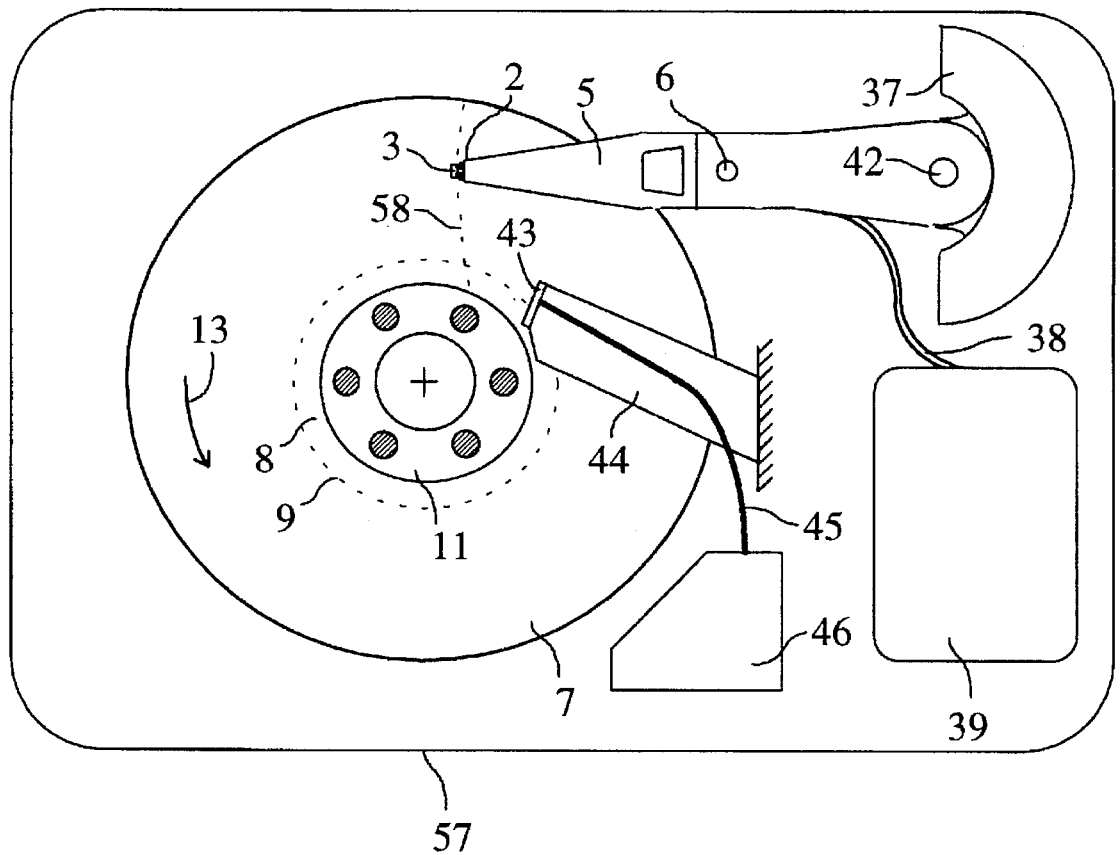
FIG. 6 illustrates a disk drive device, which has been enhanced by a third embodiment of the invention.

A disk drive device, which has been enhanced by a third embodiment of the invention, is shown in FIG. 6. Referring now to FIG. 5 and FIG. 6, like numbered items perform the same function in the apparatus of the third embodiment as they do in the previously described apparatus of the second embodiment. However, the disk drive device 57 is used for data storage and retrieval, and is not used for testing purposes, in the third embodiment of the invention. Conventional firmware instructions cause disk drive device electronics 39 to cause actuator 37 to move head 1 along arc 58 to conventional landing zone 8 during periods of device starting and stopping. Landing zone 8 is comprised of as a portion of the surface of the disk 7, defined relative to a boundary circle 9 of predetermined radius. The primary conventional purpose of landing zone 8 is to provide a surface area of unique texture, on which to land head 1, during periods when the relative motion 13 of the disk 7 is insufficient for creation of gas bearing 56. In the third embodiment of the invention, a means 43 for generating ultrasonic sound is mounted on a fixed brace 44, in such an orientation that it concentrates sound energy near the intersection of arc 58 and landing zone 8. Electronic driving means 46, which is capable of automatic switching depending on the state of device operation, drives ultrasonic sound generating means 43, via electrical connection 45. Ultrasonic sound generation is switched on during periods of device starting and stopping, so as to reduce static friction and average sliding friction of the interface between head 1 and disk 7, and switched off during periods of normal operation, to avoid air bearing resonance excitation during normal operation. If ultrasonic sound is adequately concentrated in the region of intersection of arc 58 and landing zone 8, then automatic switching of the driving signal carried in connection 45 may not be necessary, since the switching on and off of ultrasonic sound impingement, on the interface between head I and disk 7, could be accomplished by gross changes in the instantaneous proximity of the head 1 to said intersection.

What I claim is:

1. A method for increasing the surface wear rate associated with the relative tangential motion between two normally proximate surfaces, which are separated, or tending to be separated, by a thin layer, or partial layer, of gas entrained between the surfaces due to said motion taking place in an atmosphere of said gas, and in which:

a) said method includes induced vibration as a means to increase the intensity or frequency of contact between said surfaces, and b) said vibration is induced by means of generating ultrasonic pressure waves in the gaseous atmosphere, which travel through said gaseous atmosphere and impinge upon said layer, or partial layer, of gas between surfaces, and c) said ultrasonic pressure waves are generated with a frequency, or frequency range, which is chosen, or tuned, so as to selectively achieve resonance of, or resonance involving, the thin layer, or partial layer, of gas between said surfaces, and d) said surfaces are surfaces of a magnetic recording head, and spinning disk media respectively.

2. The method of claim 1, wherein detection of acoustic emission intensity, within a frequency range which excludes the frequency range chosen for pressure wave generation, is used as a means to estimate the intensity or frequency of contact between said surfaces.

3. The method of claim 2, wherein said detection is used as a means to tune or alter the frequency range chosen for pressure wave generation, in order to achieve said resonance.

4. The method of claim 1, wherein data is periodically recorded on said disk by means involving said head, and then the readability of said data is periodically measured during the course of the wear acceleration test, by means involving the same head and the same disk, and said readability is compared with one or more prior readability measurements, to provide an indication of interface surface wear or degradation.

5. The method of claim 1, wherein friction at the interface, is periodically measured, and used as an indication of interface surface wear or degradation.

6. An apparatus, for increasing the surface wear rate associated with the relative tangential motion between two normally proximate surfaces, said surfaces being surfaces of a magnetic recording head, and disk media, respectively, and said surfaces being separated, or tending to be separated, by a thin layer, or partial layer, of gas entrained between the surfaces due to said motion taking place in an atmosphere of said gas, and said device comprising:

a. a means for initiating and maintaining said relative tangential motion in a controlled manner, which includes a spindle capable of rotation, and a means for clamping the disk media to said spindle, and b. a means for keeping the surfaces normally proximate, and c. a means for containing, and maintaining the purity of, the gaseous atmosphere surrounding the interface, and d. a means for generating ultrasonic pressure waves in said gaseous atmosphere, with a frequency, or frequency range, which is chosen, or tuned, so as to achieve resonance of, or resonance involving, the thin layer, or partial layer, of gas between said surfaces, and e. a means for directing said ultrasonic pressure waves to impinge upon said layer, or partial layer, of gas between the surfaces, and f. a means for indirect measurement of the extent of interface wear or degradation during operation of the apparatus.

7. The apparatus of claim 6, wherein said means for generating ultrasonic pressure waves, in said gaseous atmosphere, is comprised of a whistle.

8. The apparatus of claim 6, wherein said means for generating ultrasonic pressure waves in said gaseous atmosphere is comprised of a vibrating structure, which is excited to vibrate according to the piezoelectric effect, or according to magnetostriction.

9. The apparatus of claim 8, wherein said vibrating structure includes a concave surface for focusing ultrasonic pressure waves to a region of said gaseous atmosphere which includes the location of said impingement.

10. The apparatus of claim 8, wherein said vibrating structure is comprised of a plurality of sub structures, of common electrical connection, so as to produce pressure waves with the same frequency in the gaseous atmosphere, and the plurality of sub structures are spatially arranged so as to concentrate wave intensity, according to the principles of wave interference, in regions of the gaseous atmosphere which include the location of said impingement.

11. The apparatus of claim 6, wherein said means for indirect measurement of the extent of interface wear or degradation, is comprised of a means for periodic measurement of friction at the interface.

12. The apparatus of claim 6, including a means for the detection of acoustic emission, and including a frequency band pass filter, of high pass filter, capable of limiting said detection, to exclude the frequency range chosen for the generation of ultrasonic sound in said gaseous atmosphere.

13. The apparatus of claim 6, including electronic means for enabling said head to record and read-back data on said disk, and including means for detecting the amplitude of, or errors in, the read-back signal, so as to provide an indication of interface surface wear or degradation.

14. The apparatus of claim 13, wherein a fully assembled, or partially disassembled, disk drive device is used to facilitate:

a) said data recording, and b) said read-back, and c) the control of relative surface motion, thereby increasing the number of surface interfaces tested simultaneously, or thereby further reducing the extent to which interface testing conditions differ from operating conditions in the disk drive device.

15. A magnetic disk drive information storage device, including:

a) a single magnetic disk or plurality of magnetic disks, arranged concentrically about the axis of rotation of a common spindle, and b) a plurality of magnetic recording heads, mounted on an actuator which controls the radial position of the recording heads with respect to circular tracks of data which are written on the disk surfaces, and c) a motor which turns the spindle and causes the disks to co-rotate, thereby creating relative tangential motion between the disk surfaces and the magnetic recording heads, and d) a plurality of gas bearings formed due to said relative tangential motion, said gas bearings being located at the interface between each magnetic recording head and the disk surface adjacent to the same magnetic recording head, and e) an electronic means for causing data to be written and read from the surfaces of the disk during operation, and for controlling said actuator and said motor, and f) a means for enclosing or filtering the gaseous atmosphere which surrounds the magnetic recording heads and the disk surfaces, and g) a means for generating ultrasonic sound in said gaseous atmosphere during normal operation of the device, with a frequency range which includes one or more resonance frequencies of said gas bearings, and h) a means for directing said sound to impinge upon, or have increased intensity in, regions of said atmosphere which include said gas bearings, so that the frequency and intensity of physical contact between the heads and disk surfaces is increased during periods of normal operation, and the usable lifetime of the device is thereby reduced for testing purposes.

* * * * *